United States Patent
Kim et al.

(10) Patent No.: US 9,483,694 B2
(45) Date of Patent: Nov. 1, 2016

(54) IMAGE TEXT SEARCH AND RETRIEVAL SYSTEM

(71) Applicants: Sang Hun Kim, Seoul (KR); Peter Wayne de Fremery, Larkspur, CA (US)

(72) Inventors: Sang Hun Kim, Seoul (KR); Peter Wayne de Fremery, Larkspur, CA (US)

( * ) Notice: Subject to any disclaimer, the term of this patent is extended or adjusted under 35 U.S.C. 154(b) by 124 days.

(21) Appl. No.: 14/605,886

(22) Filed: Jan. 26, 2015

(65) Prior Publication Data

US 2015/0213593 A1  Jul. 30, 2015

Related U.S. Application Data

(60) Provisional application No. 61/931,675, filed on Jan. 26, 2014.

(51) Int. Cl.
*G06K 9/00* (2006.01)
*G06K 9/68* (2006.01)

(52) U.S. Cl.
CPC ......... *G06K 9/00463* (2013.01); *G06K 9/6857* (2013.01); *G06K 9/6892* (2013.01)

(58) Field of Classification Search
CPC ............... G06K 9/00463; G06K 2209/01; G06K 9/6857; G06K 9/6892; G06T 2207/10004; G06T 2207/30176; G06T 7/0081

See application file for complete search history.

(56) References Cited

U.S. PATENT DOCUMENTS

| | | | | |
|---|---|---|---|---|
| 5,870,084 A * | 2/1999 | Kanungo | ............... | H04N 21/40 345/551 |
| 5,966,637 A * | 10/1999 | Kanungo | ............... | H04N 21/40 348/461 |
| 9,047,511 B1* | 6/2015 | Vargis C | ................. | G06K 9/348 |
| 9,349,202 B1* | 5/2016 | Manohar | ................. | G06T 11/60 |
| 2004/0037470 A1* | 2/2004 | Simske | ................. | G06F 17/273 382/229 |
| 2004/0257591 A1* | 12/2004 | Engelman | .............. | G06K 15/02 358/1.1 |
| 2006/0171588 A1* | 8/2006 | Chellapilla | .......... | G06K 9/6828 382/185 |
| 2007/0211062 A1* | 9/2007 | Engelman | ............. | G06T 11/203 345/467 |
| 2011/0025842 A1* | 2/2011 | King | ..................... | G06F 17/211 348/135 |
| 2011/0213608 A1* | 9/2011 | Sun | ........................ | G06F 17/214 704/8 |
| 2014/0257789 A1* | 9/2014 | Zaric | .................. | G06K 9/00463 704/8 |
| 2014/0344669 A1* | 11/2014 | Kawara | ................. | G06F 17/214 715/234 |
| 2015/0139559 A1* | 5/2015 | Smith | .................. | G06K 9/6215 382/225 |

* cited by examiner

*Primary Examiner* — Jingge Wu
(74) *Attorney, Agent, or Firm* — Steven A. Nielsen; www.NielsenPatents.com

(57) ABSTRACT

An imaging device comprising a flexible sensor attached to a control case. The flexible sensor provides both a source of illumination to the image being captured and a method of capturing the image. The method of capture comprises a field of reactors disbursed across the facial area of the sensor, the output of which produces a dot-pattern capture of the intended image which is passed to a storage device.

5 Claims, 8 Drawing Sheets

IMAGE TEXT SEARCH AND RETRIEVAL SYSTEM

CROSS-REFERENCE TO RELATED APPLICATIONS

This utility application claims the benefit and priority date of provisional application 61/931,675 filed on Jan. 26, 2014, the contents of which are incorporated herein by reference.

BACKGROUND OF THE INVENTION (1) Field of the Invention

The invention generally relates to pattern recognition and image database search systems. More particularly, the invention relates to means and methods of copying images and/or portions of images that are then used to search for and retrieve relevant data.

(2) Description of the Related Art

The known related art fails to anticipate or disclose the principles of the present invention.

In the related art, text strings are entered into a search engine and matching strings or partial strings are retuned in the form of search results.

In the related art, there are no known means or methods to copy and paste target images (containing text) into a search engine. The related art fails to provide effective searches of images in multiple languages or in symbols. The related art fails to provide a system in the form of a cut and paste methodology.

Thus, there is a long felt need in the art for the present invention.

BRIEF SUMMARY OF THE INVENTION

The present invention overcomes shortfalls in the related art by presenting an unobvious and unique combination and configuration of methods and components to allow an end user to copy a selected section of image data and then copy the selected image data into a search engine to retrieve relevant data.

Image data may also be associated with fonts, thus an effective search may be performed by entering strings of text to be searched.

The invention overcomes shortfalls in the related art by creating and using a distance map for each target image or glyph and then using the derived distance map to assign a Unicode key to the subject glyph.

The invention overcomes shortfalls in the related art by the creation and use of pixel based and geometry based matching systems in addition to the disclosed distance mapping systems. In general distance mapping systems may generate Unicode values for glyphs that are stored within the system. But, the system will accept glyphs that have not been assigned Unicode values, and for such glyphs, pixel and geometry matching may be used to retrieve relevant search results. The use of pixel, geometry and vector based matching is sometimes called "crude matching" herein.

The invention overcomes shortfalls in the related art by allowing users to copy and paste from non-text files such as jpeg and other formats. In the related art, copy and paste searches work only with text files wherein the encoded may be copied into the search engine.

For academic research and other endeavors, searchers are often presented with jpeg scans of documents and need to be able to copy and paste selections of such documents directly into a search engine.

The invention overcomes shortfalls in the art by not requiring transcription or full text input of selected search images. For example, Chinese or Korean words or other non-western symbols may be captured, matched, and also converted into Unicode or other values and then matched with similar symbols in a database. By allowing captured images to be matched in the target images that contain text and other information can be searched without the need for encoding the target images. By converting captured images into Unicode and other values, search images and database images may be similarity converted into Unicode values for efficient matching and retrieval.

The integrated crude match module overcomes shortfalls in the related art by allowing a disclosed system to store glyphs without such glyphs being mapped or assigned to Unicode values. Thus, a master database may comprise both Unicode to represent glyphs and patterns, image parts, and vector data to store glyphs. The crude match system uses a new scanning system to recognize glyphs.

In general, a disclosed embodiment, system or process may work as follows:

1. Images are loaded into the system. A master database, library or library of reference material is parsed and converted into Unicode or other values. In one example, a master database may comprise Korean literature. Some of the literature may be easily converted into Unicode by traditional optical character recognition systems and some of the literature may be entered in the form of rough scans or photographs that are not amenable to traditional OCR. The rough scans may comprise symbols or glyph images of non-uniform size and style that make traditional OCR impossible. Moreover, such scans may comprise dark backgrounds around the symbols, as older documents tend to yellow or otherwise discolor. These documents can be searched on their own using crude matching. To create a master database, a disclosed embodiment converts the images of the crude scans into Unicode or other values and the Unicode or other values are stored in a master database. The same disclosed embodiment may be used for Unicode conversion in a disclosed cut, past and search system, wherein the master database is searched using Unicode derived from a searcher's cut and paste selection or crude matching.

A disclosed crude matching system may entail a combination of pixel and geometry matching. In the disclosed crude matching module, images may be matched from a master database wherein such master database images have not been encoded. After a crude matching system is executed, a more refined matching system may follow, as described below. Images may be entered into the master database by crude matching processing wherein image patterns and/or vector patterns are recorded. On the user side, a crude matching search involves target search patterns to be matched with patterns within the master database.

A disclosed Unicode conversion system may include a user interface, image processing module, image matching module, image normalization module, image distance mapping module, coarse matching module, fine matching module, a Unicode matching module, a master database and an output module.

In one process, in building a master database, all pages of a book may be scanned. An image processing module converts and saves each character in a normalized size or as a normalized image. Background color or page yellowing may be removed. Each image may also be saved as geometry information or distance information.

Using geometry or distance information, each image may be converted into a distance map, wherein a distance map comprises a one dimensional image that represents symbol or glyph part distances from the center of the glyph. The distance map module or system may assign or map letters, a to z, to each glyph boundary. The distance of each mapped letter from a center point is then converted or represented in a distance map. A distance map may appear to be a string of white and black spots within a line of boxes. Each glyph has a unique distance map and each distance map is assigned a Unicode or key. In a disclosed database structure, each record comprises a Unicode key, glyph and distance map.

In practice, scanned images can be blurred and characters or perceived glyphs can be distorted or contorted due to poor handwriting and/or the old age of the document. After a distance map is made the distance map may not be directly known in a database or have been assigned a Unicode key. A disclosed process of probability matching or coarse matching module deals with this scenario.

Reference materials are converted into Unicode to create a master database, and/or reference materials may be entered via the crude image processing module. In a second phase or end user implementation, a researcher may photograph, scan or cut and paste an image into the disclosed system. The user interface may enter the user selected image into the system wherein the symbols of the image are converted into Unicode and the found Unicode is matched with Unicode strings in the master database. The search results may comprise selections of the master database containing text areas having symbols of the entered search image. Also on the user side, a search may be entered as a pattern or vector value, and then matched within the master database via the crude matching module.

These and other objects and advantages will be made apparent when considering the following detailed specification when taken in conjunction with the drawings.

Figure 1:
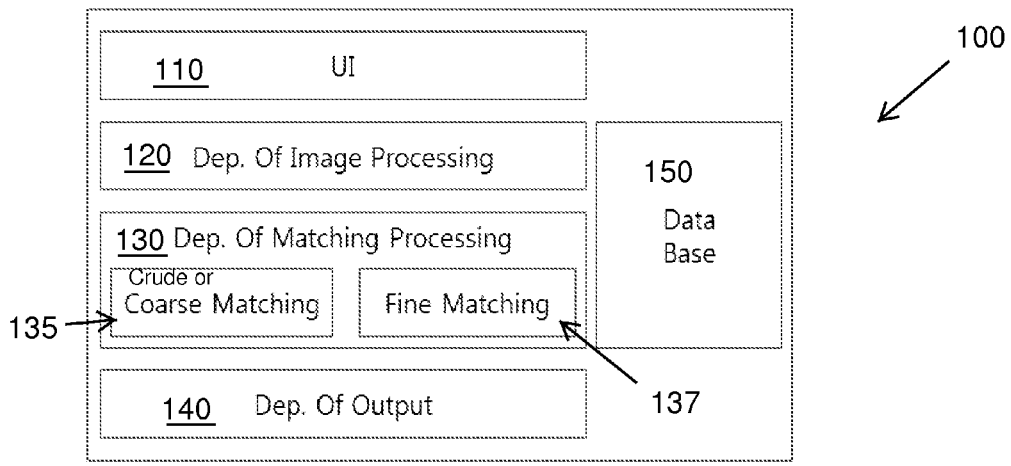
FIG. 1 depicts a hardware configuration

REFERENCE NUMERALS IN THE DRAWINGS 100 specialized computer system
110 user interface module
120 module or processor of image processing
130 module or processor of image processing
135 module or system of coarse matching
137 module or system of fine matching
140 module or system of output
150 database or a master database
200 glyph or symbol shown as a bitmap image
210 gird used to depict a glyph
215 square filled in to correspond to a glyph segment
220 center point of a square filled in to correspond to a glyph segment
225 end point "c" at edge of glyph
227 end point "a" at near center of glyph
228 marked point "b" of a glyph grid 210
229 a boundary point of a glyph
300 distance map
310 empty box of a distance map
320 filled box of a distance map
400 database structure
410 Unicode or key header of database structure 400
413 Unicode or key value of database structure 400
420 glyph or symbol header of database structure 400
423 glyph or symbol of database structure 400
430 distance map header of database structure 400
433 distance map of database structure 400
500 raw symbols or glyphs
510 symbols or glyphs after normalization or other processing
600 a book or other object to be used for a search or to be entered into a master database
700 symbols or glyph images selected for processing
710 raw symbols or glyph images
715 a raw symbol or glyph cut by a user
720 post processed raw symbols or glyph images normalized and with page background removed
730 a normalized image ready for distance mapping
800 a distance mapping matching process
810 found probabilities of a searched distance map matching distance map in a master database
815 a matched Unicode, the Unicode from a master database
817 a derived Unicode of an image or glyph used in a search
820 a plurality of distance map candidates of a master database
900 system generated Unicode values
1000 a display of results
1010 matching symbols or glyphs shown in a display of results
1100 a crude matching system
1110 a forward search
1120 cut pattern
1130 selected object
1140 search area
1150 a backward search
1160 matched search area

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines In disclosed embodiments, means and methods enable a user to define and capture an area of a computer screen, then use the captured area as a "search term." The captured "search term" is compared to segments in a data base of "target image(s)," which can be the same or different. If matching patterns in the "search term" and the "target image(s)" are discerned, a match is registered and appropriate sections of the target image, text or screen views are returned to the end user.

This method can be used to search any image data but is particularly useful for searching verbal texts. With this method, the content of a text image can be searched for key words without the need for typing in text symbols.

The terms "image" and "glyph" may be the same and may mean any symbol, non-symbol or other printing which may or may not have been printed, such as "born-digital" material.

FIG. 1 depicts a specialized computer that may comprise one or more specialized processors, processors specialized for image processing and processors specialized for distance map production from processed images. Disclosed embodiments include the use of general processors. A disclosed embodiment may include the use of processors specialized for glyph normalization, distance mapping, crude matching, coarse matching; fine matching of derived distance maps to known distance maps or Unicode, outputs of results, conversion of selected glyphs into bitmap images, the images having marked points, with the marked points measured from a center point, and other functions. The crude search includes the matching of unencoded glyphs by use of pixel, pattern or vector matching.

FIG. 1 further depicts a disclosed system 100 comprising a user interface 110, the user interface allowing a selection, or cutting and a pasting or entry of selected images into the system for searching. A disclosed system may further include module of image processing 120, or module of match processing, a database 150 or master database and a module of output 140.

Figure 2:
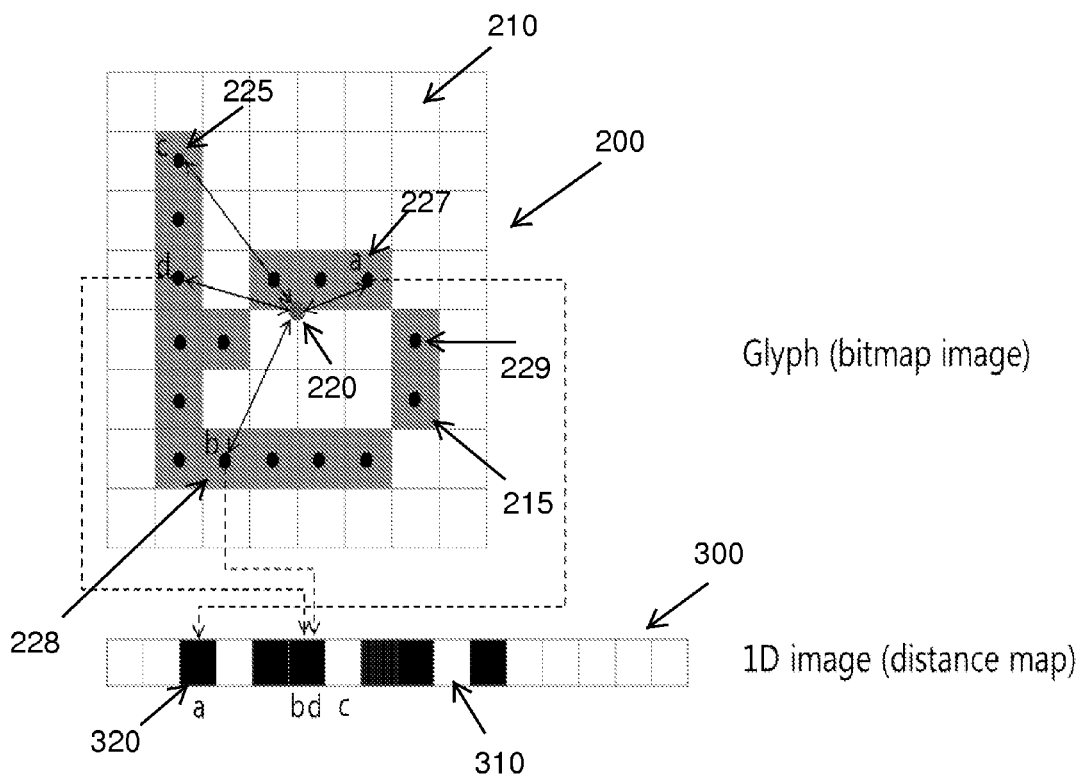
FIG. 2 depicts the conversion of a symbol, glyph or bitmap image into a distance map or one dimensional image.

FIG. 2 depicts an image or glyph 200 processed into a bitmap image or other format, the processed image transposed onto a plurality of squares or upon a grid 210, with various endpoints and/or boundary areas marked. The marking may take the form of "a" to "z". Each marked area may be measured from a center point 220. The distance of each marked area from the center point may be used to construct a distance map 300. This is part of a fine matching processes.

For example, marked point "a" 227 is relatively close to the center point 220 and thus could be shown in a filled box 320 of the distance map 300, the filed box being close to the edge of the distance map. Marked point "b" 228 is further from the center point and is thus depicted to the right of point "a" upon the distance map 300. Point "c" 225 is shown even further to the right upon the distance map. Different shades of grey, various patterns and other symbols may be used upon the distance map to represent a glyph.

Figure 3:
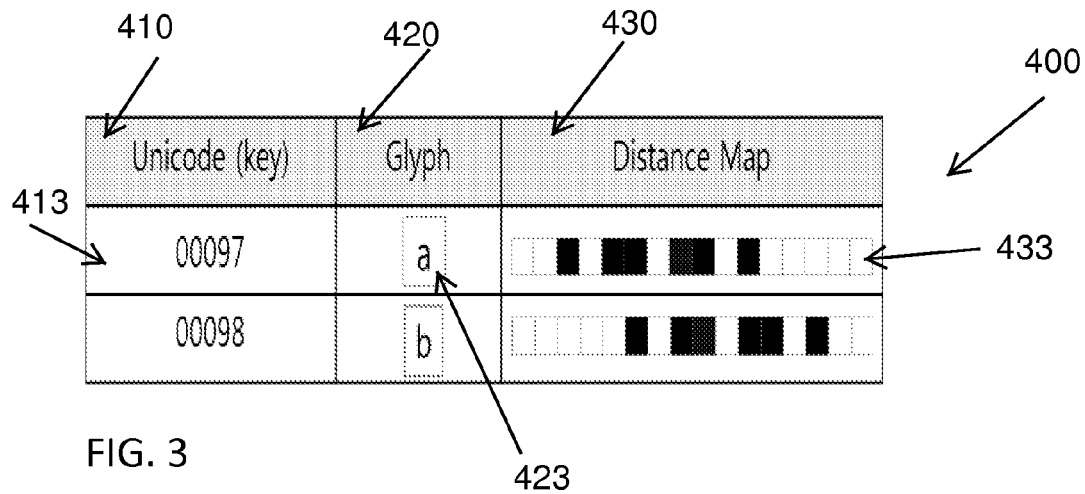
FIG. 3 depicts a disclosed database system

FIG. 3 depicts the mapping or correlation of glyphs and distance maps to Unicode. This interesting database structure 400 features a Unicode or key header 410, a glyph or symbol header 420, a distance map header 430 and may comprise Unicode 413, glyphs or symbols 423 and distance maps 433. This database structure may reside within a database 150, the database sometimes called a master database. A master database may contain a plurality of database structures and may contain reference materials. In a search process, a target glyph or target book may be entered into the system to find matches within the material of a master database.

Figure 4:
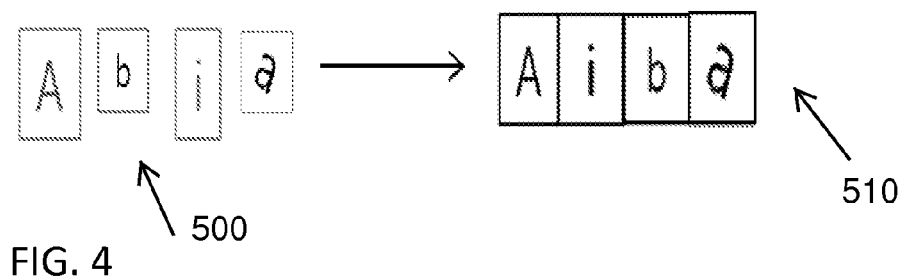
FIG. 4 depicts a process of image normalization

FIG. 4 depicts various raw symbols or glyphs 500 that are processed and formed into glyphs after normalization. The normalization process may entail the removal of background noise, such as yellowed pages. The normalization process may further entail the transposing of figures into standard sizes and spacing.

Figure 5:
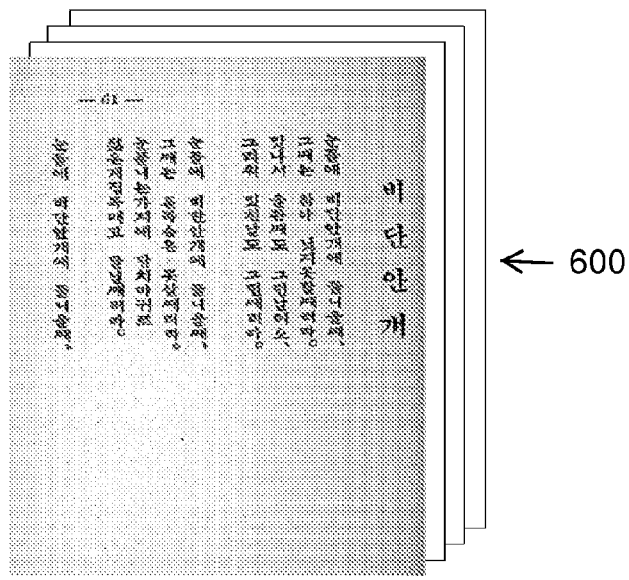
FIG. 5 depicts a process of entering a book into the system

FIG. 5 depicts a book or other object having glyphs to be entered into a disclosed embodiment. An entire book may be entered as a search. An entire book may be added to a master database.

Figure 6:
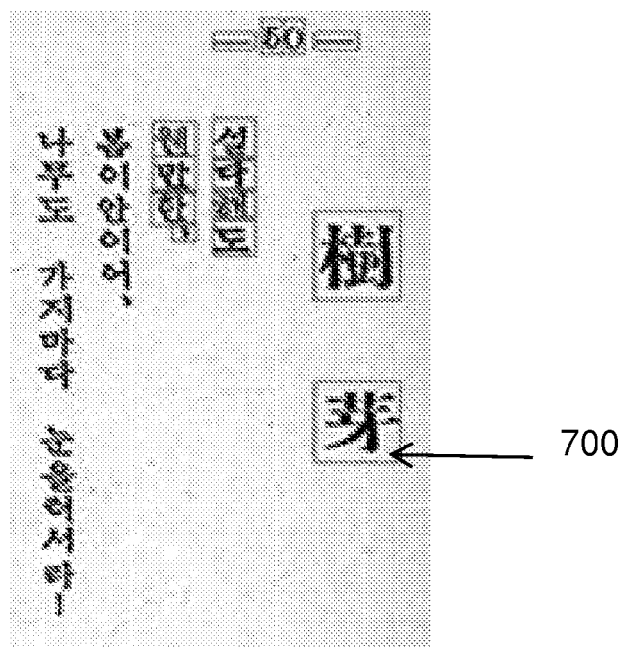
FIG. 6 depicts a selection of symbols or glyphs

FIG. 6 depicts a plurality of selected glyphs 700. A glyph may be selected by a user or selections may occur automatically.

Figure 7:
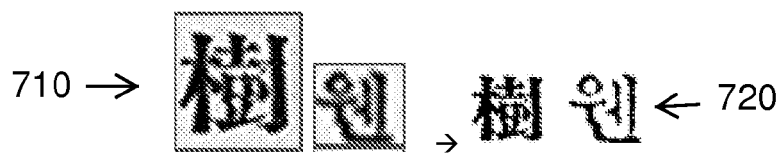
FIG. 7 depicts the normalization or cleanup of selected symbols

FIG. 7 depicts raw symbols or glyph images 710 just prior to normalization. A normalized output 720 or post processed glyph may be devoid of background noise and may be displayed or redrawn in a standard size.

Figure 8:
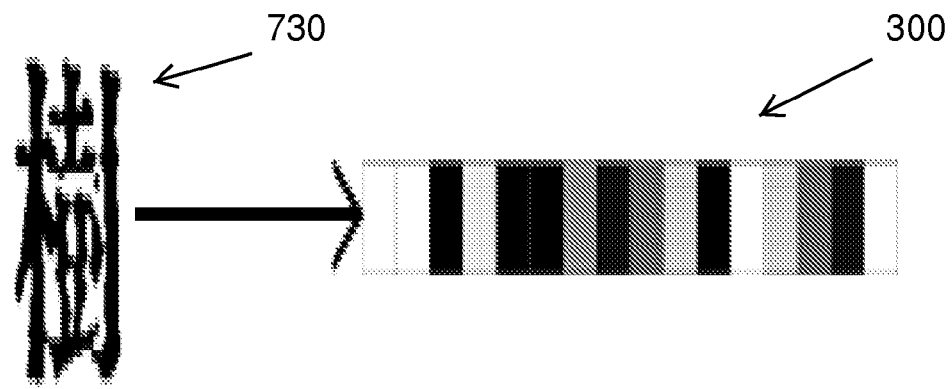
FIG. 8 depicts a conversion of a symbol into a distance map

FIG. 8 depicts a transformation of a normalized image 730 ready for distance mapping and a corresponding distance map 300.

Figure 9:
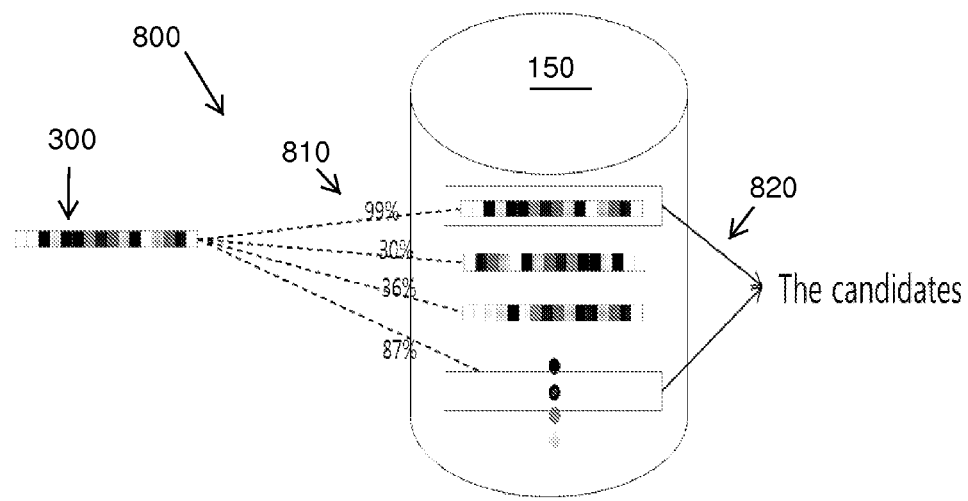
FIG. 9 depicts a process of assigning distance maps to known distance maps or Unicode

FIG. 9 depicts a coarse or gross mapping of a distance map to one or more master database distance maps. A coarse distance mapping process 800 may comprise system assignments of found probabilities 810 to a search distance map. A plurality of distance map candidates 820 are shown and may be later used in a fine or refined selection process discussed below. The selection of matching distance maps may be iterative in that lowest match possibility is removed and the process repeats until just one candidate remains.

Figure 10:
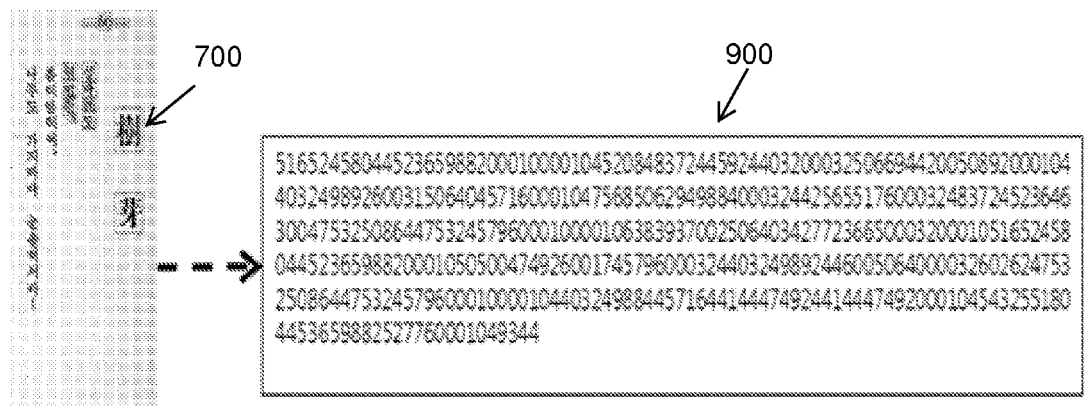
FIG. 10 depicts a process of converting symbols into Unicode

FIG. 10 depicts the conversion of selected glyphs 700 into system generated Unicode values 900.

Figure 11:
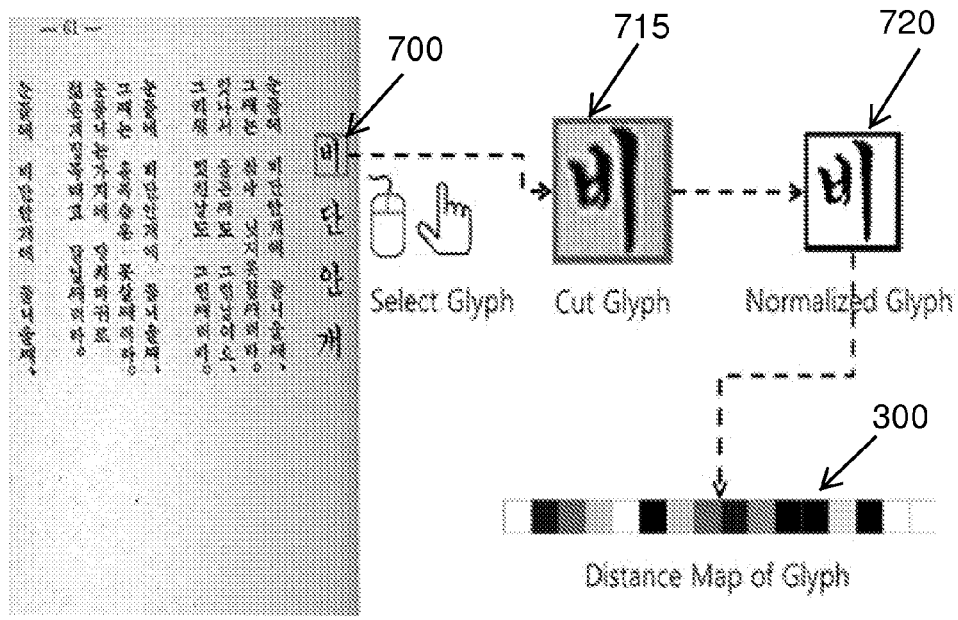
FIG. 11 depicts a process of selecting a glyph and subsequent system processing

FIG. 11 depicts a disclosed system and process wherein a user selects or marks a glyph 700 for processing, the glyph is cut 715 or otherwise parsed, the system may then produce a normalized glyph 720 which is ready for distance mapping, resulting in a corresponding distance map 300.

Figure 12:
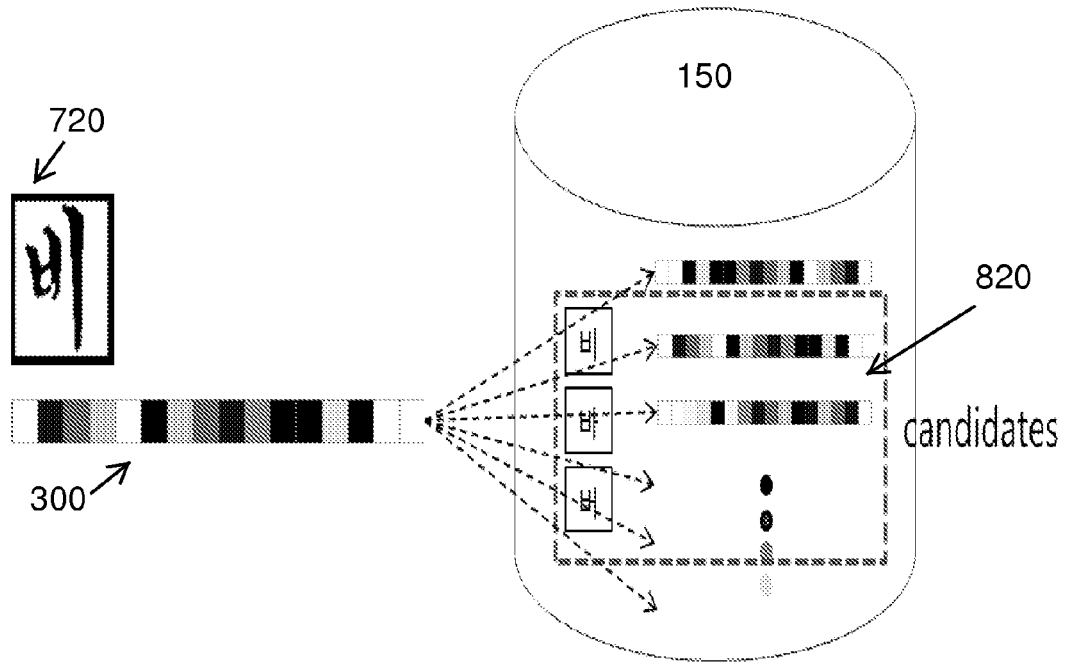
FIG. 12 depicts a coarse process of assigning distance maps to known distance maps or Unicode

FIG. 12 depicts a gross, initial or coarse matching wherein a post processed symbol 720 is used to create a distance map 300 the subject distance map is used to find a corresponding distance map in a database 150. Distance map candidates 820 may be defined as having a fixed probability of matching, such as 85%.

Figure 13:
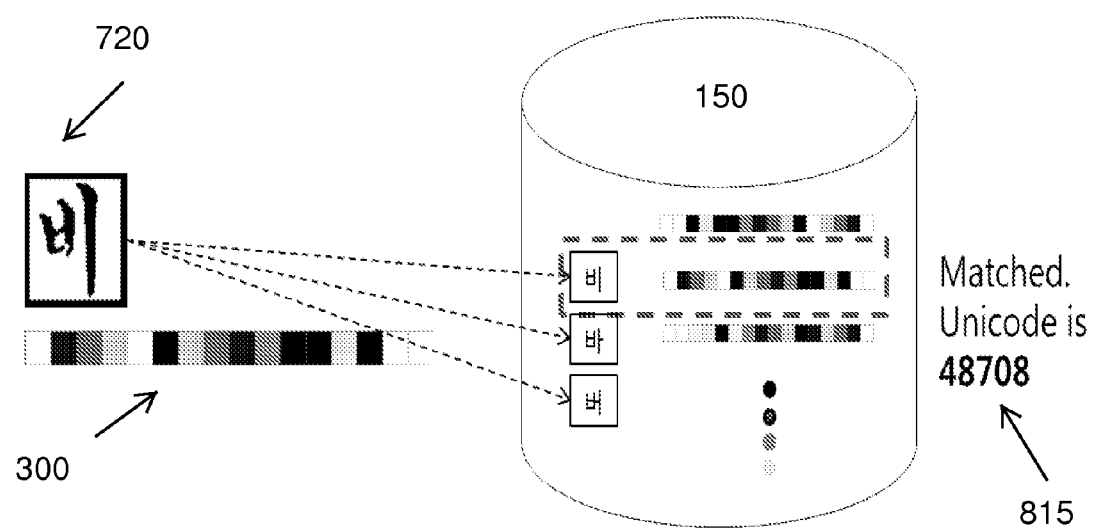
FIG. 13 depicts a fine or more refined process of assigning a distance map to a known distance map or Unicode

FIG. 13 depicts a refined or fine matching wherein candidate glyph images are matched by a pixel comparison. Upon finding a match, the corresponding Unicode value is recovered and used to produce search results. In the present example, a match Unicode 815 is found and displayed.

Figure 14:
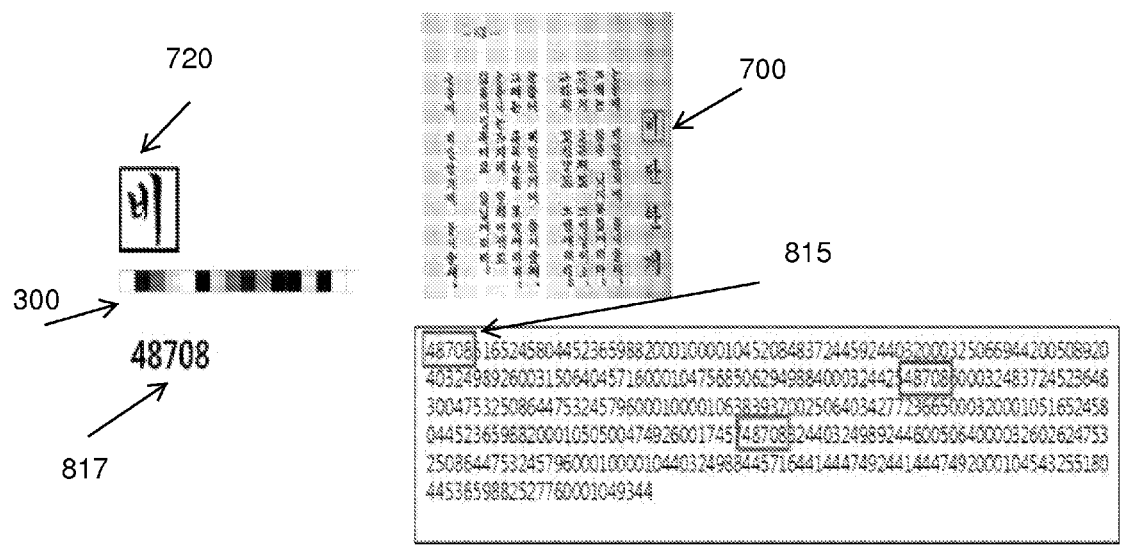
FIG. 14 depicts a conversion of symbols into Unicode

FIG. 14 depicts a system overview that includes the display of matched Unicode 815 within a string of Unicode. A matched Unicode 817 value of 48708 is shown. The matched Unicode value 817 corresponds to the selected symbol 700, the post processed symbol 720 and the distance map 300.

Figure 15:
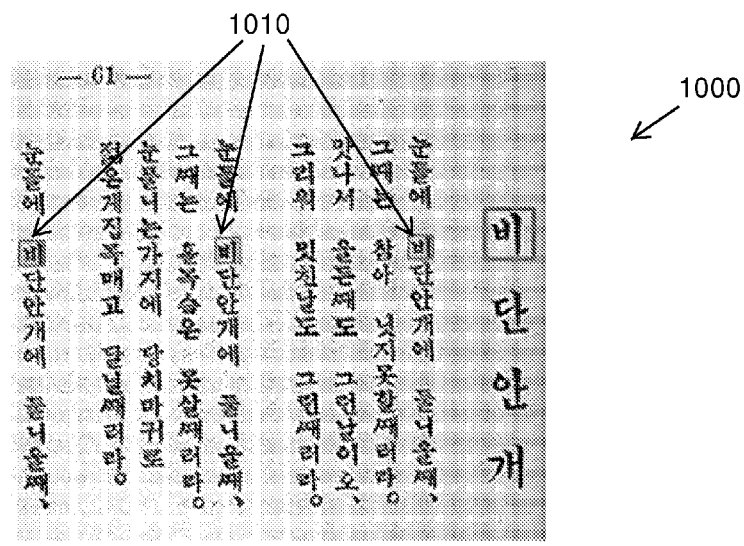
FIG. 15 depicts a display of matching symbols upon a page found in a master library

FIG. 15 depicts a display of results 1000 comprising matching glyphs 1010. By use of the Unicode, the displayed results may be easily translated into other languages.

Figure 16:
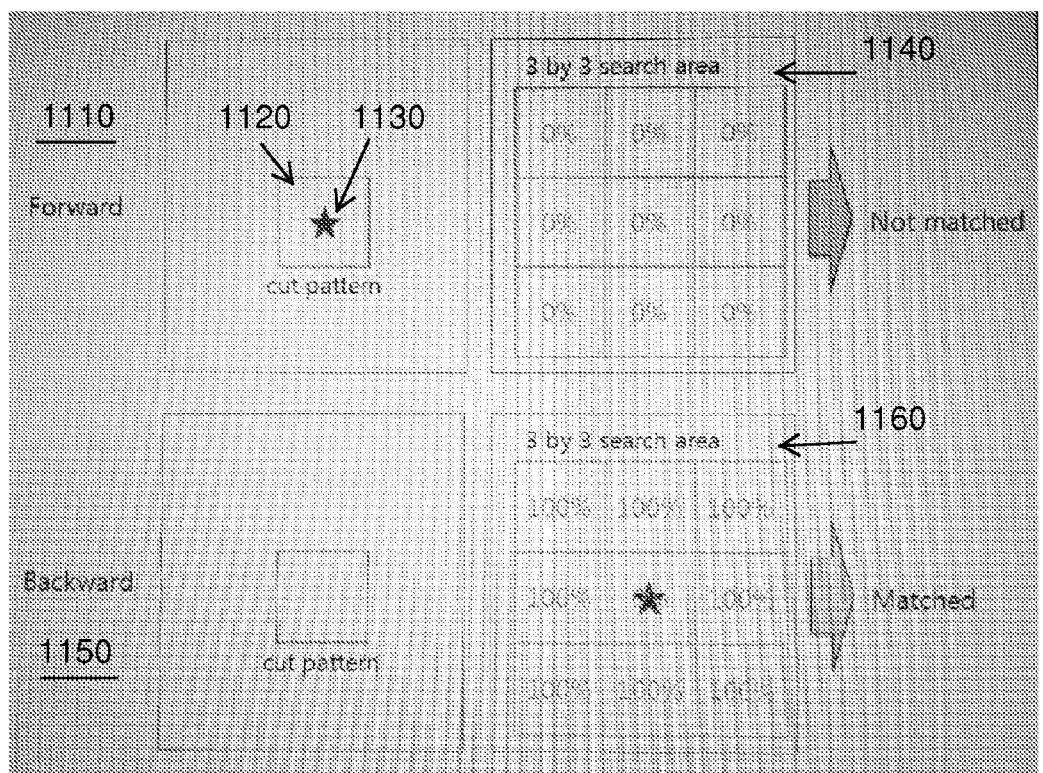
FIG. 16 depicts a disclosed image matching system

FIG. 16 depicts a crude matching process that may occur before a fine matching process. In a crude matching process pixel, pattern or vectors are matched. In a disclosed embodiment, the process may be described as follows:

Step 1. "Cut" or copy an image selection to be searched.
Step 2. Create a pattern, index or other computer readable data for search
  convert binary image
  remove noise (high pass filtering)
Step 3. Coarse Searching by pixel based method
  Search pattern using pixel based comparing pattern and page images
Step 4. Refine Searching results by geometry (vector) based method
  Convert pattern (rasterize character) to vector character
2. Pattern matching algorithm based on pixel value.

FIG. 16 describes a forward process 1110 wherein a star 1130 is captured in a cut pattern 1120. The star is not found in the search area 1140.

Based upon the forward search or other input, the star is now entered into the master database. The new search area 1160 now contains the star.

Items

Disclosed embodiment may be described herein in the form of items.

Item 1. A system to create a master database of glyphs and to search the master database with target selections of glyphs and to return portions of the master database containing glyphs matching the target selections, the system comprising:
  a) a computer system comprising a processor, non-volatile memory, machine readable media, machine instructions upon the machine readable media, the master database, a user interface, an image processing module, an image matching module, a coarse matching module, a fine matching module and an output module;
  b) the image processing module configured to accept selections of glyphs, convert the glyphs to bitmap images, map the glyphs upon grids, mark sections of the glyphs and to create distance maps by marking a string of linear boxes with marks corresponding to the distance of the marked sections to a glyph center point;
  c) the matching module configured to assign a Unicode to each glyph and each distance map to create a database structure and database that is entered into the master database;
  d) the image processing module further configured to accept target selections of glyphs and to create corresponding distance maps as described in b) above;
  e) the image matching module configured match distance maps of target selections to distance maps of the master database;
  f) the module of output configured to display sections of the master database containing target glyphs.

What is claimed is:
1. A system that can identify unencoded textual information in images and create a master database of glyphs that can be used to search the master database with target selections of glyphs, and return portions of the master database containing glyphs, the system comprising:
  a) a computer system comprising a processor, non-volatile memory, machine readable media, machine instructions upon the machine readable media, the master database, a user interface, an image processing module, an image matching module, a crude matching module, a coarse matching module, a fine matching module and an output module;
  b) the image processing module configured to accept selections of glyphs, match the glyphs, with like glyphs, convert the glyphs to bitmap images, map the glyphs upon grids, mark sections of the glyphs and create distance maps by marking a string of linear boxes with marks corresponding to the distance of the glyph marked sections to a glyph center point;
  c) the matching module configured to assign a value that may be Unicode to each glyph, and each distance map to create a database structure and database that is entered into the master database;
  d) the image processing module further configured to accept target selections of glyphs and to create corresponding distance maps as described in b) above;
  e) the image matching module configured match distance maps of target selections to distance maps of the master database; and
  f) the module of output configured to display sections of the master database containing target glyphs
  g) a coarse matching module configured to accept glyphs and enter glyph pattern data into the master database and the coarse matching module configured to match searched glyphs to glyphs of the master database by use of pattern matching.

2. The system of claim 1 wherein the matching module is configured to perform a coarse search wherein pixels and image geometry are matched, a coarse search finding probability percentages of search candidates found in the master database, and a finite number of the search candidates of the highest probability of matching are used in a fine search module wherein pixels and/or geometry are matched to find a final selection.

3. The system of claim 1 wherein the crude search module accepts a cut pattern and the cut pattern is transposed into a grid with the grid comprising a plurality of grid boxes.

4. The system of claim 3 wherein components of a cut pattern are mapped into the grid boxes of the grid.

5. The system of claim 4 wherein the mapped portions of the grid boxes are used to match input cut patterns.

* * * * *